May 16, 1933.   J. S. TOOHEY ET AL   1,909,598
METAL SAWING MACHINE
Filed Feb. 6, 1929    4 Sheets-Sheet 1

John S. Toohey
Malcolm E. Erskine
INVENTORS.

BY Charles & French
ATTORNEYS

May 16, 1933.    J. S. TOOHEY ET AL    1,909,598
METAL SAWING MACHINE
Filed Feb. 6, 1929    4 Sheets-Sheet 2
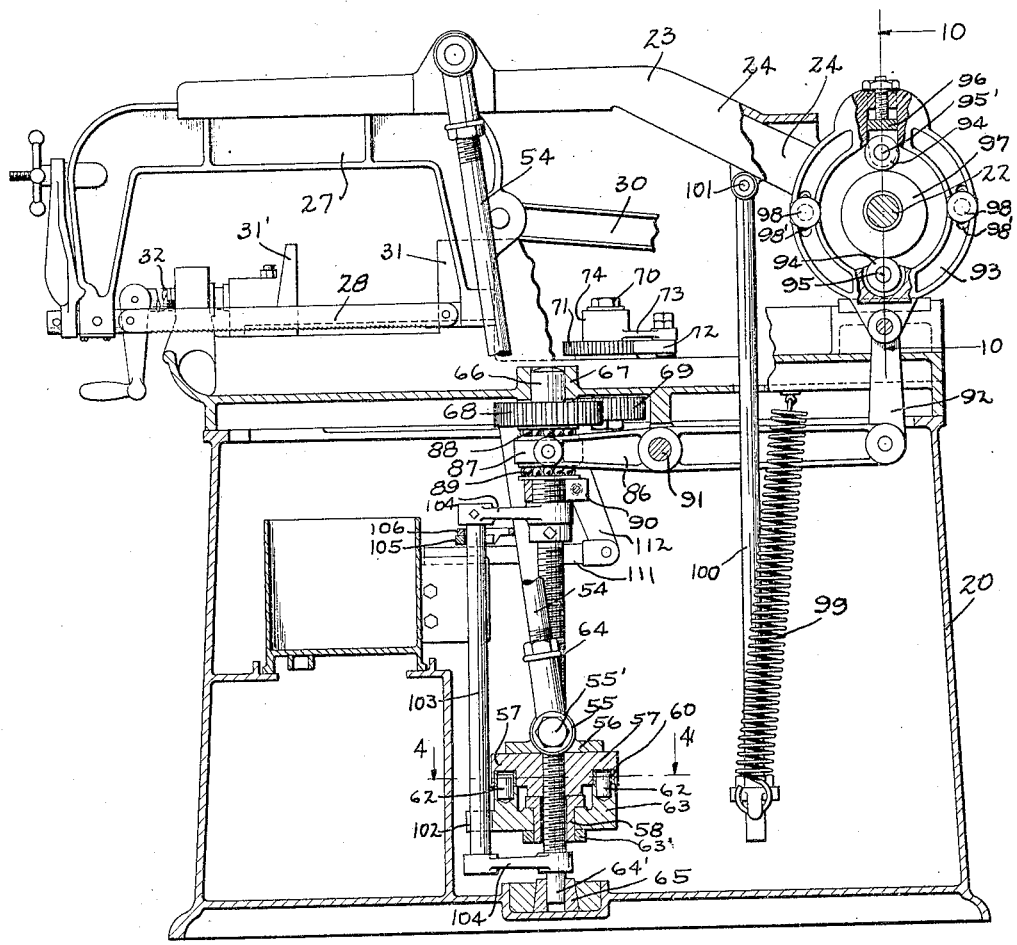
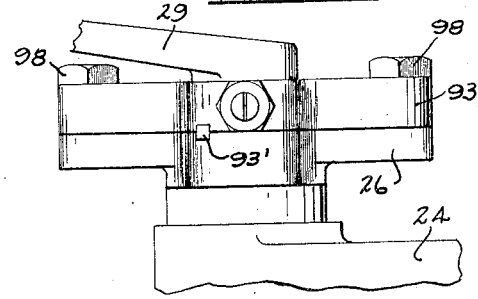

May 16, 1933.  J. S. TOOHEY ET AL  1,909,598
METAL SAWING MACHINE
Filed Feb. 6, 1929  4 Sheets-Sheet 3
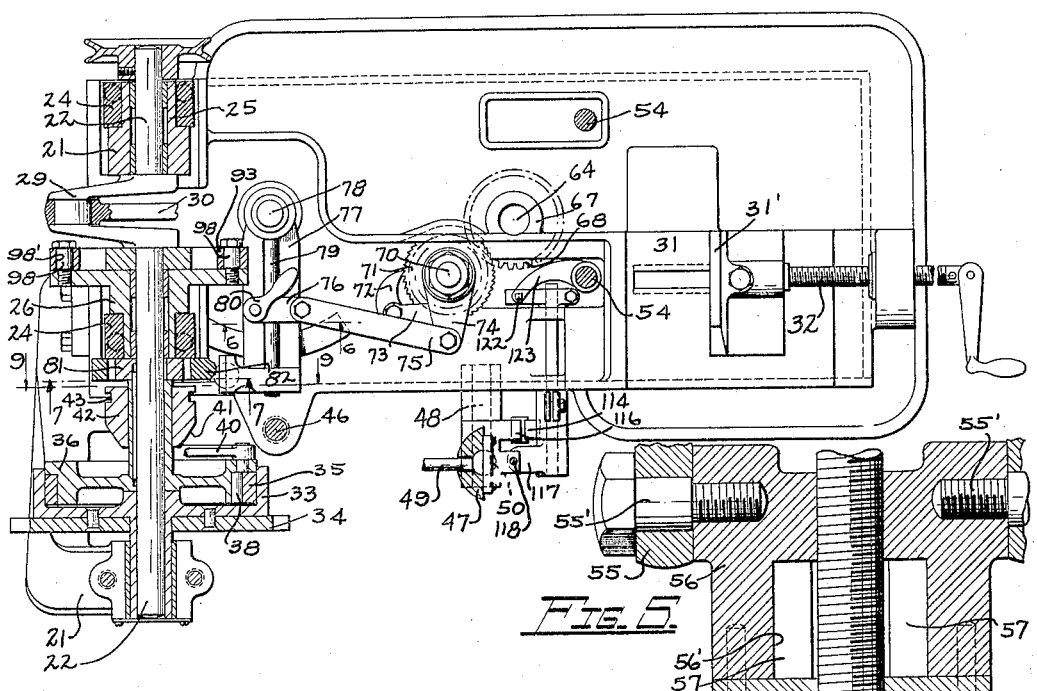
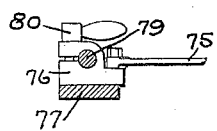
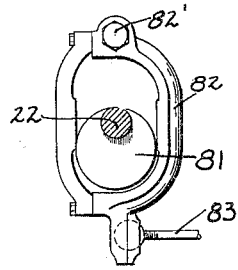
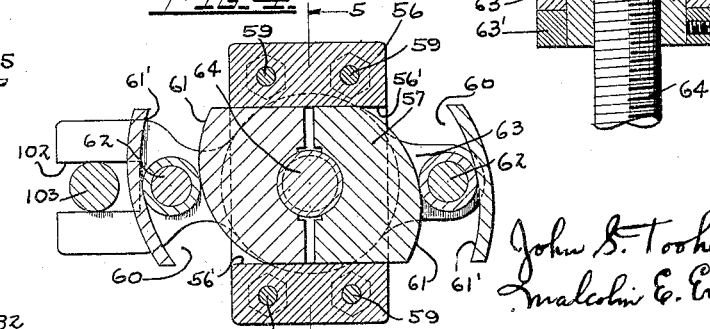
John S. Toohey
Malcolm E. Erskine
INVENTORS.
BY Searles & French
ATTORNEYS

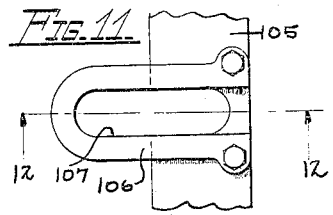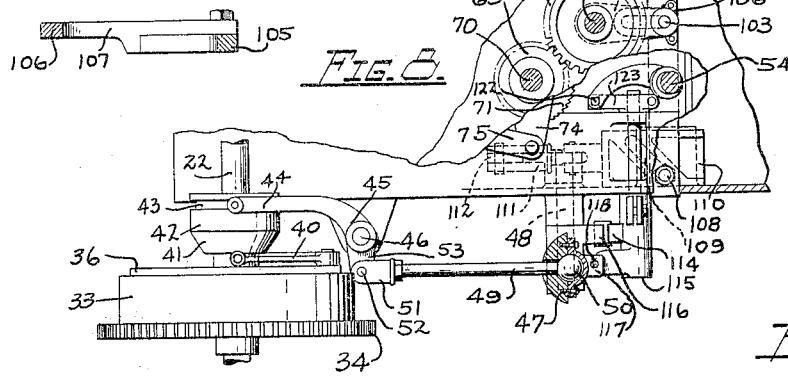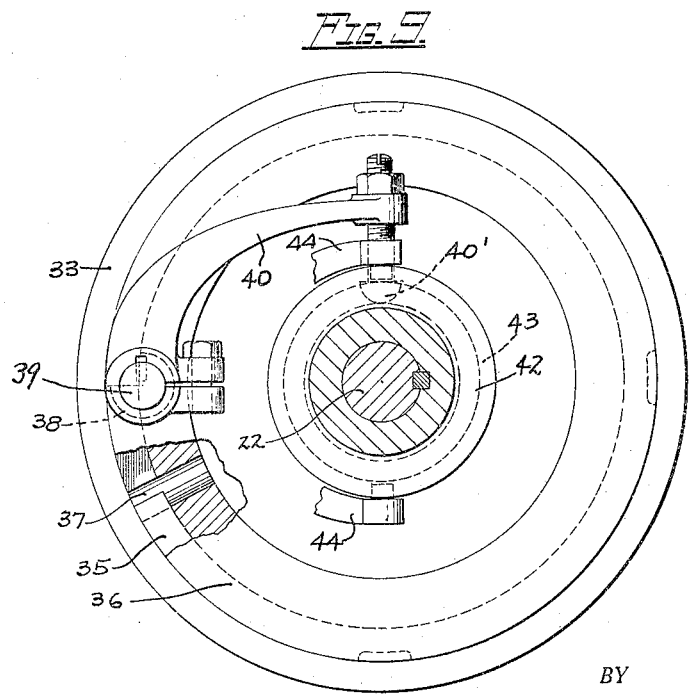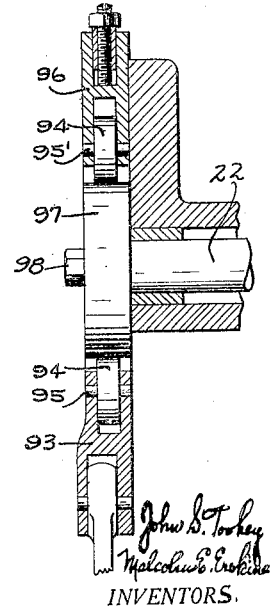

Patented May 16, 1933

1,909,598

UNITED STATES PATENT OFFICE

JOHN S. TOOHEY AND MALCOLM E. ERSKINE, OF RACINE, WISCONSIN, ASSIGNORS TO RACINE TOOL AND MACHINE COMPANY, OF RACINE, WISCONSIN, A CORPORATION OF WISCONSIN

METAL SAWING MACHINE

Application filed February 6, 1929. Serial No. 337,990.

The invention relates to a metal sawing machine.

The object of the invention is to provide a metal sawing machine of the type in which the saw is positively fed into the work during the cutting stroke of the saw and more particularly to improve upon the metal sawing machine of our prior application, Serial No. 132,968, filed September 1, 1926. According to the present invention the use of springs associated with the split nut has been eliminated and the split nut is positively moved into and out of operative position. Further improvements over the aforesaid application are in the arrangement and construction of the clutch control and its association with the manual and automatic control of the saw feeding means.

The invention further consists in the several features hereinafter set forth and more particularly defined by claims at the conclusion hereof.

In the drawings Fig. 1 is a side elevation view of a metal sawing machine embodying the invention, parts being broken away and parts being shown in section;

Fig. 2 is a similar view taken from the other side of the machine, showing a vertical section through the base portion of the machine;

Fig. 3 is a detail plan view of portions of the machine, the saw and its frame, the clutch shifter lever being omitted, the drive shafts and parts associated therewith being taken in section along the line 3—3 of Fig. 1;

Fig. 4 is a detail sectional view taken on the line 4—4 of Fig. 2;

Fig. 5 is a detail vertical sectional view through the split nut structure taken on the line 5—5 of Fig. 4;

Fig. 6 is a detail sectional view taken on the line 6—6 of Fig. 3;

Fig. 7 is a detail sectional view taken on the line 7—7 of Fig. 3;

Fig. 8 is a detail plan view of a portion of the machine showing the clutch and split nut control, parts being shown in section and parts being broken away;

Fig. 9 is a detail sectional view taken on the line 9—9 of Fig. 3, showing the clutch, parts being broken away and parts being shown in section;

Fig. 10 is a detail sectional view taken on the line 10—10 of Fig. 2;

Fig. 11 is a detail elevation view of the yoke-shifter bar;

Fig. 12 is a sectional view taken on the line 12—12 of Fig. 11;

Fig. 13 is a detail plan view of mechanism for relieving the saw on its non-cutting stroke;

Fig. 14 is a detail view of parts of the clutch-release mechanism.

Referring to the drawings, the numeral 20 designates the base or frame of the machine provided with suitable uprights 21 in which the drive shaft 22 is journalled. A saw-carrying frame 23 has bifurcated rear end portions 24 pivotally mounted on cylindrical bearing portions 25 and 26 concentric with said shaft. The saw frame 27 is mounted to slide, as usual, in guideways in said frame and has the cutting saw 28 secured thereto in any suitable manner.

The saw frame 27 is reciprocated back and forth relative to the frame 23 and the work by means of a crank 29 formed in the drive shaft and operatively connected to said frame by the usual connecting rod 30.

The work is held in position, as usual, by a vise 31 including a movable sliding jaw 31' which is actuated by a vise-screw 32.

The shaft 22 has a clutch disk 33 loosely mounted thereon carrying a sprocket wheel 34 which is adapted to be connected by a chain and sprocket (not shown) to any suitable source of power, such as an electric motor or other form of prime mover. This disk is adapted to be secured in driving relation with the shaft 22 by means of a clutch band 35, shown in detail in Fig. 9, which is in the form of a split ring carried on a disk 36 keyed to the shaft 22. One end of this ring is fixed against movement by means of a pin 37 secured to the disk 36 and the other end is engaged by a cam 38 which has a shank portion 39 pivotally mounted in the disk 36 and carrying a lever 40. The lever 40 has an end portion 40' adapted to be engaged by a conical end 41 of a collar 42 slidably mounted on the hub of the disk 36. This collar is provided with an annular groove 43 in which works the bifurcated ends 44 of a shifter fork 45 pivotally mounted on a stationary shaft 46 secured to the frame of the machine.

Moving the fork 45 forwardly causes the collar 42 to engage the lever 40 and swing the same upwardly to expand the band 35 against the disk 33, thereby establishing the drive to the shaft 22 from the source of power. Manual shifting of the clutch is controlled through a hand lever 47 secured to a pivoted shaft 48 and operatively connected to the shifter fork by a link 49 having a ball joint connection 50 with the lever 47 and a forked end 51 secured by pin 52 to an arm 53 on the shifter 45, whereby movement of the lever 47 toward the right, as viewed in Fig. 1, acts to shift the clutch to operative position, as previously described.

Pivotally secured to the saw-carrying frame 23, on opposite sides thereof, are supporting rods 54, which are pivotally connected at their lower ends 55 by studs 55' to a block 56 whose bottom face is slotted to form a guideway 56' for a pair of split nut members 57, see Figs. 4 and 5. The members 57 also work between the upper end of the slot in said block and a flanged collar 58 secured to the block 56 by bolts 59. As shown in Figs. 2 and 4, each of the members 57 is provided with a groove 60 forming cam surfaces 61 and 61' in which a bushed pin 62 works. The pins 62 are mounted on an oscillatory lever 63 which is medially pivoted upon the collar 58 between the flanges thereof and a set collar 63'. The split nut members 57 engage a threaded feed or screw shaft 64 which extends loosely through the block 56 and collar 58 and is slidably mounted at its lower end 64' in a bearing 65 in the frame of the machine and at its upper end 66 in a boss 67 in the frame of the machine, whereby the block 56 and rods 54 are moved downwardly by the downward feed of the split nut members.

The feed or screw shaft 64 carries a gear 68 meshing with and slidably mounted with respect to a gear 69 on a shaft 70, see Figs. 2 and 3. This shaft 70 carries a ratchet wheel 71 engaged by a pawl 72 pivotally mounted on an arm 73 of a lever 74 which is pivoted on the shaft 70. The lever 74 is connected by a link 75 with a block 76 slidably mounted on an oscillatory member 77 pivotally mounted on a shaft 78 and including a rod 79. The block 76 has a split collar portion engaging the rod 79 and adapted to be secured in adjusted position along the same by a clamping screw 80, see Fig. 6. The oscillatory member 77 is operated from the drive shaft 22 by a cam 81 engaging a yoke-shaped follower 82 pivoted at its upper end 82' to the frame of the machine and pivotally connected at its lower end by a link 83 to said member, said link having ball and socket connections 84 and 85 with said yoke 82 and member 77, respectively.

With this construction, during the cutting stroke of the saw the cam 81 acts to shift the bar 77 and through the linkage, including the lever 74, moves the pawl 72 to turn the ratchet wheel 71 through a distance of one or more teeth and hence turns the gears 69 and 68 and hence the feed or screw shaft 64, whereby the split nut members 57, being then engaged with said shaft 64, act to exert a downward pull on the links 54 and thus feed the saw into the work during the cutting stroke. The extent of feed of the saw is governed by the throw of the link 75 and this in turn is regulated by adjustment of the block 76 relative to the member 77, since movement of the block 77 toward the pivot 78 shortens the throw of the link 75 and movement of said block away from said pivot lengthens the throw and hence the throw imparted to the pawl 72.

Referring to Fig. 2, during the non-cutting stroke of the saw the same is slightly raised above the cut, to prevent wear of the blade, by means of a lever 86 which has forked ends pivotally connected to a collar 87 interposed between thrust bearings 88 and 89, these parts being secured between the gear 68 and a clamping collar 90 secured to the feed shaft 64. The lever 86 is pivoted on a shaft 91 secured to the machine frame and its outer end is connected by a link 92 to a cam follower 93. This cam follower is in the form of a yoke having diametrically disposed rollers 94 journalled on pins 95 and 95', respectively, the pin 95 being secured directly to the yoke while the pin 95' is adjustably secured thereto by a vertically adjustable H-shaped block 96, said rollers bearing on a cam 97 fixed to the drive shaft 22. Referring to Fig. 13 it will be seen that the yoke is guided in its up and down movements by a key 93' secured to either said yoke or the bearing 26 and moving in a key slot in the other of said parts, it being further noted that pins 98 secured to the bearing 26 work in slots 98' in said yoke. With this construction the cam 97, during the non-cutting stroke of the saw, acts to swing the lever 86 so as to move the feed screws 64 upwardly through the connections previously described and thus relieve the saw of pressure on the work during the non-cutting stroke.

The weight of the saw, its frame and the carrying-frame is preferably counterbalanced by a pair of springs 99, one being shown, on each side of a rod 100 connected at one end to said rod and at the other end to the frame, said rod being pivotally connected at 101 to the saw-carrying frame 23.

It has been noted that the split nut members 57 are associated with the lever 63 which carries the pins 62 and from Fig. 4 it will be noted that when said lever 63 is turned in one direction the cam surfaces 61 and 61' act to move the members 57 inwardly into feeding engagement with the shaft 64 and when turned in the opposite direction said members 57 are positively released from said shaft. Thus the split nut is opened and closed positively. For oscillating the lever 63 the same is provided with a slotted end 102 in which a rod 103 of a shifting yoke works. This rod 103 is secured to arms 104 loose on the feed shaft 64. This yoke is turned to thereby turn the lever 63 by a bar 105 having a block 106 bolted thereon with a slot 107 formed in said parts receiving the rod 103. The bar 105 is slidably guided in the frame of the machine and carries a pin 108 engaged in an inclined slot 109 in a sliding block 110, see Figs. 1 and 8. The block 110 is connected by an adjustable link 111 with a lever arm 112 keyed to the shaft 48 for the lever 47.

A spring 113 is secured at one end to the lever arm 112 and anchored at its other end to the machine and acts to normally move said arm and lever 47 to an inoperative position, that is, to a position where the clutch is thrown out. With this construction, movement of the arm 112 through the clockwise rotation of the shaft 48 causes the block 110 to shift the bar 105 and hence the yoke, including the rod 103, so as to move the lever 63 to bring the split nut members 57 into engagement with the feed screw 64, this movement taking place at the time the clutch is thrown in and, vice versa, movement of the clutch 47 to a release position causes a release of the split nuts 57.

When the clutch lever 47 is moved to a forward position a dog or latch 114 on a shaft 115 makes contact with a dog or latch 116 connected to the shaft 48 thereby holding the clutch lever 47 in a forward position. The dog 114 has a projecting foot 117 adapted to be engaged by a rod 118. This rod is slidably mounted on the lever 47 and normally urged to inoperative position by a spring 119 and is moved to engage the foot 117 to disengage the dogs 114 and 116 by means of a pivoted lever 120 which is pivotally connected to the upper end of said rod. When the rod 118 is moved downwardly to release the dogs 114 and 116 the clutch lever 47 may then be moved to the release position to throw out the clutch and through the arm 112, block 110 and bar 105 to open the split nut. The dog 114 is urged to a position to engage the dog 116 by means of a spring 121. The release is also automatically effected when the saw reaches the end of its cut by means of a detent or pin 122 secured to one of the links 54 and engageable with a projecting arm 123 on the shaft 115 carrying the dog 114 whereby the downward movement of the saw-carrying frame at the end of the cut causes the pin 122 to swing the dog 114 out of engagement with the dog 116 and thereby permits the spring 113 to shift levers 47 and 112 to release position, thereby opening the split nuts 57 and releasing the clutch.

From the foregoing description it will be noted that moving the clutch lever 47 toward the right throws in the clutch and also moves the split nut members 57 into engagement with the rod 64 and rotation of the shaft 22 then causes the saw frame 27 to reciprocate and move the saw 28 back and forth over the work, the split nut members 57 constantly feeding downwardly upon the screw 64 and thereby, during the cutting stroke of the saw, positively feeding the saw into the work, this pressure being relieved on the return stroke of the saw by the lifting of the whole feeding structure, including the feed shaft 64, links 54 and the saw-carrying frame 23 by the lever 86 and its connections with the cam 97. As soon as the saw has completed its work the feed screw is automatically disengaged and the clutch thrown out through the action of the parts 122, 123, 114 and 116, as above described. The feed may also be thrown out at any time by the manual operation of the lever 120.

We desire it to be understood that this invention is not to be limited to any particular form or arrangement of parts except insofar as such limitations are included in the claims.

What we claim as our invention is:

1. In a metal sawing machine, the combination with a saw and its frame and means for reciprocating the same, of positive feed means for the saw comprising a screw shaft, a split nut on said shaft operatively connected to said saw frame, means for effecting the engagement and disengagement of the sections of said nut comprising a manually-controlled lever and connections between said lever and the sections of said nut, a pivoted latch engageable with said lever for maintaining said lever in nut-engaging position and including an oscillatory shaft provided with spaced arms, a movable member carried by said lever and manually operable independently of the movement of said lever to engage one of said arms to release said latch, and a member movable with the saw frame and engageable with the other of said arms to release said latch when the saw reaches a predetermined position.

2. In a metal sawing machine, the combination with a saw and its frame, of means for reciprocating the same including a drive shaft, a clutch, and clutch-shifting means including a clutch-shifting lever, positive feed means for the saw comprising a screw shaft, a split nut on said shaft operatively connected to said saw frame, means for controlling the movement of the sections of said split nut by said lever, latch means engageable with said lever for maintaining said lever in clutch-engaging and nut engaging position, a manually movable member mounted on said lever and movable independently thereof for releasing said latch means, and means controlled by the saw for releasing said latch means.

In testimony whereof, we affix our signatures.

JOHN S. TOOHEY.
MALCOLM E. ERSKINE.